(12) United States Patent
Lee

(10) Patent No.: US 9,187,226 B2
(45) Date of Patent: Nov. 17, 2015

(54) POUCH PACK HAVING A PRESSURE OUTLET

(76) Inventor: Jae Ho Lee, Seoul (KR)

(*) Notice: Subject to any disclaimer, the term of this patent is extended or adjusted under 35 U.S.C. 154(b) by 313 days.

(21) Appl. No.: 12/996,206

(22) PCT Filed: Jun. 3, 2009

(86) PCT No.: PCT/KR2009/002943
§ 371 (c)(1),
(2), (4) Date: Dec. 3, 2010

(87) PCT Pub. No.: WO2009/148256
PCT Pub. Date: Dec. 10, 2009

(65) Prior Publication Data
US 2011/0079609 A1    Apr. 7, 2011

(30) Foreign Application Priority Data
Jun. 3, 2008    (KR) .................. 10-2008-0052119

(51) Int. Cl.
*B65D 35/22*    (2006.01)
*B65D 75/30*    (2006.01)
(52) U.S. Cl.
CPC .................................... *B65D 75/30* (2013.01)
(58) Field of Classification Search
USPC .......... 222/107, 92, 206, 212, 491, 494, 213, 222/215, 94, 541.4
See application file for complete search history.

(56) References Cited

U.S. PATENT DOCUMENTS

| 5,993,530 A * | 11/1999 | Tanaka et al. .............. 106/206.1 |
| 2003/0220456 A1 * | 11/2003 | Kaku et al. .................... 525/419 |
| 2004/0065679 A1 * | 4/2004 | Peuker et al. ................. 222/107 |
| 2005/0173455 A1 * | 8/2005 | Hagihara ...................... 222/107 |
| 2006/0081648 A1 * | 4/2006 | Harper ........................... 222/107 |
| 2007/0119862 A1 * | 5/2007 | Backes et al. .................. 222/94 |
| 2007/0175920 A1 * | 8/2007 | Takada et al. ................ 222/107 |
| 2007/0228073 A1 * | 10/2007 | Mazzarino .................... 222/107 |

FOREIGN PATENT DOCUMENTS

| JP | 07-068635 | 3/1995 |
| JP | 2000-229364 | 8/2000 |
| JP | 07-016956 | 1/2007 |
| JP | 2007-289643 | 11/2007 |
| KR | 10-2003-0081578 | 6/2004 |

OTHER PUBLICATIONS

International Search Report for PCT/KR2009/002943 mailed Jan. 6, 2010.

* cited by examiner

*Primary Examiner* — Paul R Durand
*Assistant Examiner* — Donnell Long
(74) *Attorney, Agent, or Firm* — Revolution IP, PLLC

(57) ABSTRACT

A pouch pack having a pressure outlet and a main body which is formed of two opposedly facing sheets with a sealing region thermally fused in a hermetic manner by a heating pressure mold designed for thermally pressing a target sealing region and defines a storage space inside thereof. The pressure outlet is integrally formed on the sealing region of the main body and opens under pressure to discharge a content kept within the storage space. As a cavity is formed in a part of the heating pressure mold, only a corresponding region of the cavity experiences a reduced heating temperature and reduced pressure while the sealing region is being thermally fused, so that the pressure outlet and the sealing region can be formed at the same time to therefore substantially reduce the amount of time required for the manufacturing process, with the pressure outlet being open precisely under pressure.

24 Claims, 3 Drawing Sheets

POUCH PACK HAVING A PRESSURE OUTLET

RELATED APPLICATIONS

This application is a 371 application of International Application No. PCT/KR2009/002943, filed Jun. 3, 2009, which in turn claims priority from Korean Patent Application No. 10-2008-0052119, filed Jun. 3, 2008, each of which is incorporated herein by reference in its entirety.

TECHNICAL FIELD

The present invention relates to a pouch pack with a pressing outlet that allows a substance therein to be discharged by opening due to pressure.

BACKGROUND ART

In general, pouch packs are widely used to hermetically pack skincare products, such as skin lotions, skin creams, and essences, and hair care products, such as shampoos and rinses, or hermetically pack food, such as various sources and beverages, or hermetically pack medicines, such as oriental medicine extracts or gel type medicines.

However, the pouch packs are manufactured by completely thermal-bonding the edges of two sheets of heatproof synthetic resin overlapping each other such that a package space is formed therein in the related art, such that it is required to open the pouch pack by cutting off a portion of the pouch pack in order to use the substance therein.

A pouch pack with a pressing outlet that is opened when pressure above predetermined pressure is applied has been proposed in the related art, in which the pressing outlet formed in the pouch pack of the related art is formed by semi-sealing (also called 'semi-thermal bonding').

It is required to primarily thermally bond the other sealed portions, except for the pressing outlet, of two sheets of heatproof sheet or two sheets of metal overlapping each other such that they are completely bonded, and then secondarily semi-seal only the pressing outlet, in order to manufacture the pouch pack with a pressing outlet according to the related art.

Therefore, according to the method of manufacturing the pouch pack with a pressing outlet of the related art, since it is required to seal the sealed portions except for the pressing outlet by thermal bonding and then apply semi-thermal bonding for forming the pressing outlet, there was a problem that it takes too long time to perform the entire process, particularly, it is difficult to arrange a hot-press mold to the accurate position of the pressing outlet when semi-sealing the pressing outlet, such that defects are generated in the products.

Further, since the semi-sealing is also to completely bonding the two sheets of heatproof resin or two sheets of metal by heating them, there was a problem that the pressing outlet is not fully opened even if the pouch pack is pressed.

DISCLOSURE

Technical Problem

It is an object of the present invention to provide a pouch pack with a pressing outlet that makes it possible to considerably reduce the time for the manufacturing process by simultaneously forming the pressing outlet only in one sealing process, and accurately open the pressing outlet by pressing.

Technical Solution

The objects of the present invention described above are achieved by providing a pouch pack with a pressing outlet, which includes: a body that is formed to have a space therein by hermetically thermal-bonding sealing portions with a hot-press mold that hot-presses the sealing portions of two sheets overlapping each other; and a pressing outlet that is integrally formed at the sealing portions of the body and allows a substance in the space to be discharged while being opened by pressure, in which the pressing outlet is formed simultaneously with the sealing portions by decrease in temperature and pressure only at the portion corresponding to the depression when the sealing portions are thermally bonded, due to a depression formed at a portion of the hot-press mold.

According to a preferred feature of the present invention, pressure for opening the pressing outlet is adjustable in accordance with the depth of the depression.

The objects of the present invention described above are achieved by providing a pouch pack with a pressing outlet, which includes: a body that is formed to have a space therein by hermetically thermal-bonding sealing portions with a hot-press mold that hot-presses the sealing portions of two sheets overlapping each other; and a pressing outlet that is integrally formed at the sealing portions of the body and allows a substance in the space to be discharged while being opened by pressure, in which the pressing outlet is formed simultaneously with the sealing portions by decrease in temperature only at the portion corresponding to a metal member when the sealing portions are thermally bonded, due to a seating groove formed at a portion of the hot-press mold and the metal member having thermal conductivity lower than the hot-press mold in the seating groove.

According to a preferred feature of the present invention, pressure for opening the pressing outlet is adjustable in accordance with the thermal conductivity of the metal member.

According to a more preferable feature of the present invention, two pressing outlets are formed in parallel apart from each other in the discharging direction of the substance and a preliminary discharging space is formed between the two pressing outlets.

According to a more preferable feature of the present invention, the sealing portions are formed along the edge of the body such that one space is formed in the body.

According to a more preferable feature of the present invention, the sealing portions are formed along the edge and an inner separation wall of the body such that a plurality of separate spaces is formed in the body.

According to a more preferable feature of the present invention, the body is formed by partially thermal-bonding two sheets of heatproof synthetic resin, two sheets of metal, or a sheet of heatproof synthetic resin or a sheet of metal.

According to a more preferable feature of the present invention, the body is formed by partially thermal-bonding a sheet of waterproof-coated paper and a sheet made of biodegradable synthetic resin.

Advantageous Effect

According to a pouch pack with a pressing outlet of the present invention, since the pressing outlet can be formed simultaneously with thermal-bonding of the sealing portion, such as the edge, by forming a depression, where the pressing outlet is formed, in a hot-press mold that seals two sheets of heatproof synthetic resin or two sheets of metal, or inserting metal having thermal conductivity lower than the material of the hot-press mold in a seating groove, it is possible to remarkably reduce the time for the manufacturing process.

Further, since the pressing outlet is not formed by thermal-bonding by semi-sealing, but is formed to be able to open under pressure by decrease in temperature and pressure of the hot-press mold due to the depression or decreases in temperature of the hot-press mold due to the metal member, and accordingly, it can be accurately opened by pressing the body, it is possible to provide convenience in use when the pack is used for packing skincare products, such as skin lotions, skin creams, and essences, hair care products, such as shampoos and rinses, food, such as various sources and beverages, and medicines, such as oriental medicine extracts or gel type medicines.

Further, when two pressing outlets are formed in parallel apart from each other in the discharging direction, it is possible to prevent the substance from being suddenly discharged in the first discharging and it is also possible to prevent the substance from being discharged out of the body by undesired pressure.

Figure 1:
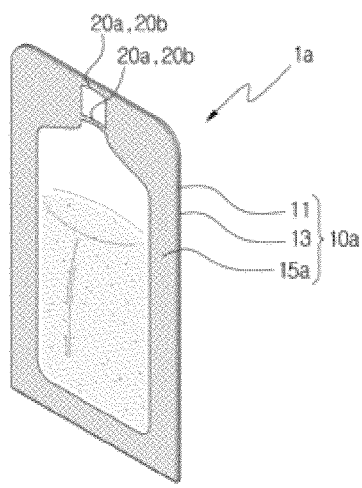
FIG. 1 is a perspective view of a pouch pack with a pressing outlet according to the present invention.

REFERENCE NUMERALS 1a, 1b, 1c: Pouch pack according to the present invention
3: Hot-pres mold
5a: Depression
5b: Seating groove
7: Metal member
10a, 10b, 10c: Body
11, 13: Sheet
15a, 15b, 15c: Sealing portion
20a, 20b: Pressing outlet
20c: Preliminary discharging space

BEST MODE

Hereinafter, preferred embodiments of the present invention are described in detail with reference to the accompanying drawings, but they are provided for those skilled in the art to easily achieve the present invention and the scope and spirit of the present invention are not limited thereto.

Figure 2:
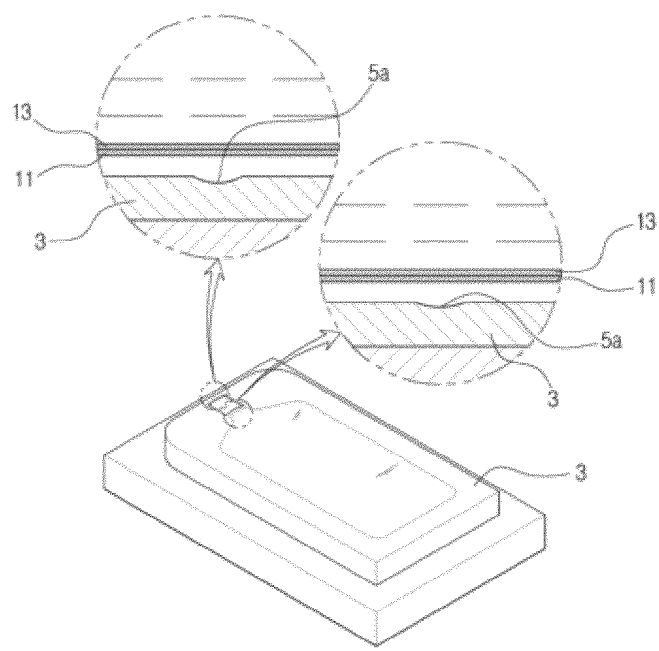
FIG. 2 is a view showing an embodiment of a hot-press mold that is used to manufacture a pouch pack with a pressing outlet according to the present invention.
Figure 3:
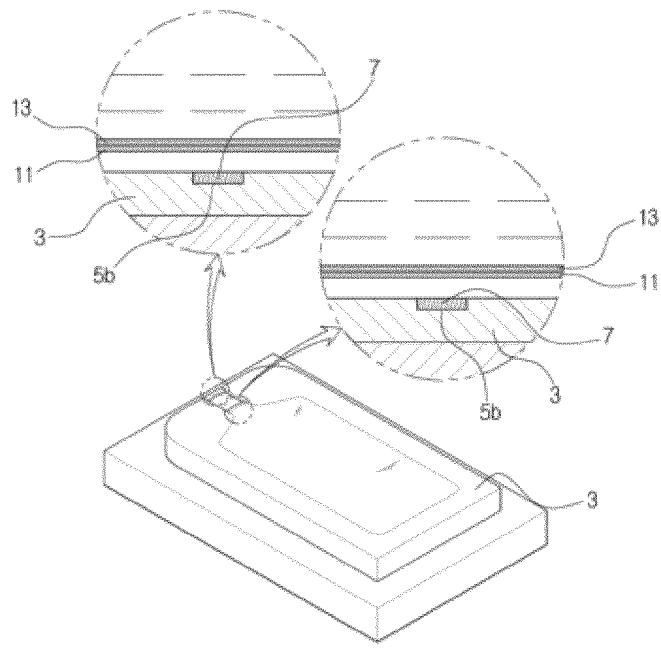
FIG. 3 is a view showing another embodiment of a hot-press mold that is used to manufacture a pouch pack with a pressing outlet according to the present invention.
Figure 4:
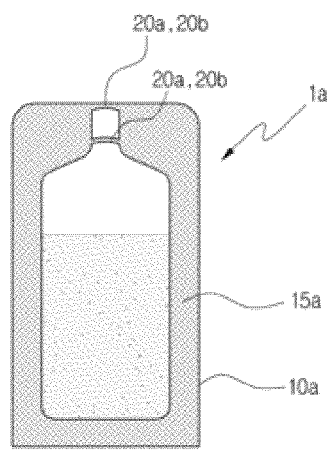
FIGS. 4 to 6 are views showing various embodiment of the pouch pack body of a pouch pack with a pressing outlet according to the present invention.
Figure 5:
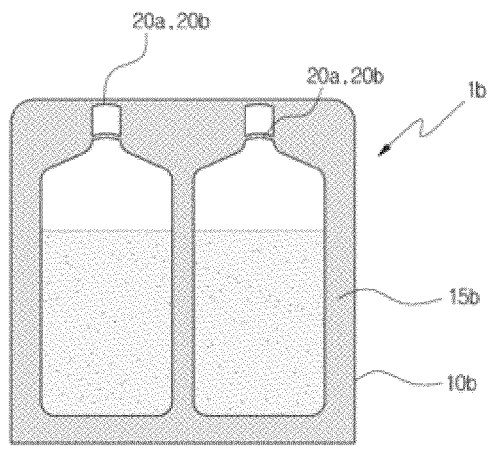
Figure 6:
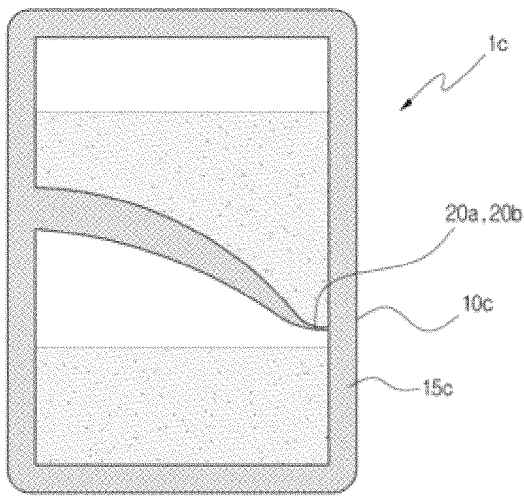

FIG. 1 is a perspective view of a pouch pack with a pressing outlet according to the present invention, FIG. 2 is a view showing an embodiment of a hot-press mold that is used to manufacture a pouch pack with a pressing outlet according to the present invention, FIG. 3 is a view showing another embodiment of a hot-press mold that is used to manufacture a pouch pack with a pressing outlet according to the present invention, and FIGS. 4 to 6 are views showing usage of pouch pack bodies 10a, 10b, 10c.

Pouch packs 1a, 1b, 1c with a pressing outlet according to the present invention make it possible to remarkably reduce the time for the manufacturing process by simultaneously forming pressing outlets 20a, 20b only in one sealing process, and accurately open the pressing outlets 20a, 20b by pressing. As shown in FIGS. 1 to 6, the pouch packs respectively include pouch pack bodies 10a, 10b, 10c of which sealing portions 15a, 15b, 15c are hermetically thermal-bonded by a hot press mold 3 thermal-bonding the sealing portions 15a, 15b, 15c of two sheets 11, 13 overlapping each other to form a space therein, and pressing outlets 20a, 20b integrally formed with the sealing portions 15a, 15b, 15c of the pouch pack bodies 10a, 10b, 10c and opened by pressing to discharge the substance from the space.

The bodies 10a, 10b, 10c, a kind of packs hermetically accommodating substances, for example, skincare products, such as skin lotions, skin creams, and essences, hair care products, such as shampoos and rinses, food, such as various sources and beverages, or medicines, such as oriental medicine extracts or gel type medicines, are manufactured by hermetically thermal-bonding the sealing portions 15a, 15b, 15c with a hot-press mold 3 after overlapping the two sheets 11, 13 on the hot-press mold 3 by using a sealing machine (not shown) including the hot-press mold 3 for hot-pressing the sealing portions 15a, 15b, 15c.

The bodies 10a, 10b, 10c are formed by partially thermal-bonding the tow sheets 11, 13 overlapping each other and the two sheets 11, 13 may be sheets made of heatproof synthetic resin, such as polyethylene or polypropylene, or depending on embodiments, for example, may be sheets made of metal, such as aluminum thin plate, or one of them is a sheet made of heatproof synthetic resin and the other one may be a sheet made of metal.

Further, the bodies 10a, 10b, 10c may be formed by partially thermal-bonding a sheet of paper 11 waterproof-coated with bio-degradable synthetic resin and a sheet 13 made of bio-degradable synthetic resin which can be naturally decomposed in terms of environment-friend, or one of the two sheets 11, 13 may be a transparent or semitransparent sheet such that the substance therein can be seen.

The sealing portions 15a, 15b, 15c of the bodies 10a, 10b, 10c, as shown in FIG. 4, may be formed at the edge of the body 10a to form only one space in the body 10a, and, depending on embodiments, as shown in FIGS. 5 and 6, the sealing portions 15b, 15c may be formed at the edges and the inner separation wall of the bodies 10b, 10c to form a plurality of separated spaces in the bodies 10b, 10c.

The thermal-bonding of the bodies 10a, 10b, 10c or receiving substances in the bodies 10a, 10b, 10c is well known in the art and the detailed description is not provided herein for a simple specification.

The pressing outlets 20a, 20b are integrally formed at the sealing portions 15a, 15b, 15c of the bodies 10a, 10b, 10c. The pressing outlets 20a, 20b are provided to discharge the contents in the spaces by being pressed, and are not formed by semi-sealing as in the pouch packs of the related art, but, as shown in FIG. 2, formed simultaneously with the sealing portions 15a, 15b, 15c due to decrease in temperature and pressure only at the portion corresponding to a depression 5a formed at a predetermined portion of the hot-press mold 3 when the sealing portions 15a, 15b, 15c are thermally bonded by the hot-press mold 3 (corresponding to 20a), or formed simultaneously with the sealing portions 15a, 15b, 15c due to decrease in temperature only at the portion corresponding to a metal member 7 by forming a seating groove 5b at a predetermined portion of the hot-press mold 3 and disposing the metal member 7, which has lower thermal conductivity than the hot-press mold 3, in the seating groove 5b (corresponding to 20b).

For the pressing outlet 20a that is simultaneously formed when the sealing portions 15a, 15b, 15c are thermally bonded by the depression 5a formed at a portion of the hot-press mold 3, the two sheets 11, 13 are not completely bonded by thermal-bonding due to direct contact and pressure from the hot-press mold 3 at high temperature, similar to the other sealing portions 15a, 15b, 15c, but the temperature and pressure at the portions corresponding to the depression 5a in the sealing portions 15a, 15b, 15c of the two sheets 11, 13 are reduced lower than the temperature and pressure at the other sealing portions 15a, 15b, 15c, due to the depression 5a, such that the portions corresponding to the depression 5a in the sealing portions 15a, 15b, 15c of the two sheets 11, 13 are not completely thermally bonded, and as a result, the portions are temporarily bonded to be separated when the bodies 10a, 10b, 10c are pressed at above predetermined pressure.

In this case, the temperature and pressure at the portions corresponding to the depression 5a in the sealing portions 15a, 15b, 15c can be adjusted when the sealing portions 15a, 15b, 15c are thermally bonded, in accordance with the depth of the depression 5a, such that the pressure for opening the pressing outlet 20a can be adjusted.

Therefore, the deeper the depression 5a, the more the pressure for opening the pressing outlet 20a decreases, while the shallower the depression 5a, the more the pressure for opening the pressing outlet 20a increases.

For the pressing outlet 20b that is simultaneously formed when the sealing portions 15a, 15b, 15c are thermally bonded by the metal member 7 at a portion of the hot-press mold 3, the two sheets 11, 13 are not completely bonded by thermal-bonding due to direct contact and pressure from the hot-press mold 3 at high temperature, similar to the other sealing portions 15a, 15b, 15c; however, the pressure at the portions corresponding to the metal member 7 in the sealing portions 15a, 15b, 15c of the two sheets 11, 13 are the same as that at the sealing portions 15a, 15b, 15c due to the metal member 7 that has low thermal conductivity, but the temperature is reduced lower than that at the other sealing portions 15a, 15b, 15c, due to the low thermal conductivity of the metal member 7, such that the portions corresponding to the metal member 7 in the sealing portions 15a, 15b, 15c of the two sheets 11, 13 are not completely thermally bonded, and as a result, the portions are temporarily bonded to be separated when the bodies 10a, 10b, 10c are pressed at above predetermined pressure.

In this case, the temperature at the portions corresponding to the metal member 7 in the sealing portions 15a, 15b, 15c can be adjusted when the sealing portions 15a, 15b, 15c are thermally bonded, in accordance with thermal conductivity of the metal member 7, such that the pressure for opening the pressing outlet 20b can be adjusted.

Therefore, the lower the thermal conductivity of the metal member 7, the more the pressure for opening the pressing outlet 20b decreases, while the higher the thermal conductivity of the metal member 7, the more the pressure for opening the pressing outlet 20a increases.

Two pressing outlets 20a, 20b are formed in parallel apart from each other in the discharging direction of the substance and it is preferable to form a preliminary discharging space 20c between the two pressing outlets 20a, 20b, in which it is possible to the substance from being undesirably discharged because the other one pressing outlet 20a, 20b is closed, even if one pressing outlet 20a, 20b is opened by pressing the bodies 10a, 10b, 10c.

Further, it is preferable that the opening pressure of the pressing outlets 20a, 20b opened first is lower than the opening pressure of the pressing outlets 20a, 20b finally opened, by adjusting the length of the depression 5a or selecting a metal member 7a having predetermined thermal conductivity, in which it is possible to prevent the substance from being suddenly discharged in the first discharging by discharging the substance into the preliminary discharging space 20c at large primary pressure and then finally discharging the substance at small secondary pressure.

According to the pouch packs 1a, 1b, 1c with a pressing outlet of the present invention described above, it is possible to considerably reduce the time for the manufacturing process, because the pressing outlets 20a, 20b can be simultaneously formed with the thermal-bonding of the sealing portions 15a, 15b, 15c, such as the edges, by forming the depression 5a, where the pressing outlets 20a, 20 are formed, in the hot-press mold 3 that seals the two sheets 11, 13, or forming the seating groove 5b and inserting the metal member 7 having thermal conductivity lower than the material of the hot-press mold 3 in the seating groove 5b.

Further, since the pressing outlets 20a, 20b are not formed by thermal-bonding by semi-sealing, but they are formed to be able to open under pressure by decrease in temperature of pressure of the hot-press mold due to the depression 5a or decrease in temperature of the hot-press mold 3 due to the metal member 7 having thermal conductivity lower than the hot-press mold 3, they can be accurately opened by pressing the bodies 10a, 10b, 10c and provide convenience in used, when the pack is used for packing skincare products, such as skin lotions, skin creams, and essences, hair care products, such as shampoos and rinses, food, such as various sources and beverages, and medicines, such as oriental medicine extracts or gel type medicines.

In particular, in the pouch pack 10c having a plurality of spaces by the separation wall, the pressing outlets 20a, 20b are formed at the wall, such that the substances in the spaces can be mixed and used by pressing the bodies 10a, 10b, 10c, if needed, in which the pouch pack 1c with a pressing outlet according to the present invention can be used as a pouch pack that makes it possible to separately accommodate or mix and use the mask sheet and essence liquid, a pouch pack that makes it possible to separately accommodate and mix and use the first component and the second component of a dyeing substance, or a pouch pack that makes it possible to separately accommodate and mix and use two kinds of sources.

Further, when the two pressing outlets 20a, 20b are formed in parallel apart from each other in the discharging direction, it is possible to prevent the substance from being suddenly discharged in the first discharging by forming the preliminary discharging space 20c and it is also possible to prevent the substance from being discharged out of the bodies 10a, 10b, 10c by undesired pressure.

INDUSTRIAL APPLICABILITY

According to a pouch pack with a pressing outlet of the present invention, since the pressing outlet can be formed simultaneously with thermal-bonding of the sealing portion, such as the edge, by forming a depression, where the pressing outlet is formed, in a hot-press mold that seals two sheets of heatproof synthetic resin or two sheets of metal, or inserting metal having thermal conductivity lower than the material of the hot-press mold in a seating groove, it is possible to remarkably reduce the time for the manufacturing process.

Further, since the pressing outlet is not formed by thermal-bonding by semi-sealing, but is formed to be able to open under pressure by decrease in temperature and pressure of the hot-press mold due to the depression or decreases in temperature of the hot-press mold due to the metal member, and accordingly, it can be accurately opened by pressing the body, it is possible to provide convenience in use when the pack is used for packing skincare products, such as skin lotions, skin creams, and essences, hair care products, such as shampoos and rinses, food, such as various sources and beverages, and medicines, such as oriental medicine extracts or gel type medicines.

Further, when two pressing outlets are formed in parallel apart from each other in the discharging direction, it is possible to prevent the substance from being suddenly discharged in the first discharging and it is also possible to prevent the substance from being discharged out of the body by undesired pressure.

The invention claimed is:

1. A method for manufacturing a pouch pack with a pressing outlet, the method comprising:
    hermetically thermal-bonding sealing portions with a hot-press mold that hot-presses the sealing portions of two sheets overlapping each other to form a body including a space therein; and
    integrally forming at the sealing portions of the body a pressing outlet to allow a substance in the space to be discharged while being opened by pressure,
    wherein the pressing outlet is formed simultaneously with the sealing portions by decrease in temperature and pressure only at the portion corresponding to the depression when the sealing portions are thermally bonded, due to a depression formed at a portion of the hot-press mold.

2. The method for manufacturing a pouch pack with a pressing outlet according to claim 1, wherein pressure for opening the pressing outlet is adjustable in accordance with the depth of the depression.

3. The method for manufacturing a pouch pack with a pressing outlet according to claim 1, wherein two pressing outlets are formed in parallel apart from each other in the discharging direction of the substance and a preliminary discharging space is formed between the two pressing outlets.

4. The method for manufacturing a pouch pack with a pressing outlet according to claim 1, wherein the sealing portions are formed along the edge of the body such that one space is formed in the body.

5. The method for manufacturing a pouch pack with a pressing outlet according to claim 1, wherein the sealing portions are formed along the edge and an inner separation wall of the body such that a plurality of separate spaces is formed in the body.

6. The method for manufacturing a pouch pack with a pressing outlet according to claim 1, wherein the body is formed by partially thermal-bonding two sheets of heatproof synthetic resin, two sheets of metal, or a sheet of heatproof synthetic resin or a sheet of metal.

7. The method for manufacturing a pouch pack with a pressing outlet according to claim 1, wherein the body is formed by partially thermal-bonding a sheet of waterproof-coated paper and a sheet made of bio-degradable synthetic resin.

8. The method for manufacturing a pouch pack with a pressing outlet according to claim 2, wherein two pressing outlets are formed in parallel apart from each other in the discharging direction of the substance and a preliminary discharging space is formed between the two pressing outlets.

9. The method for manufacturing a pouch pack with a pressing outlet according to claim 2, wherein the sealing portions are formed along the edge of the body such that one space is formed in the body.

10. The method for manufacturing a pouch pack with a pressing outlet according to claim 2, wherein the sealing portions are formed along the edge and an inner separation wall of the body such that a plurality of separate spaces is formed in the body.

11. The method for manufacturing a pouch pack with a pressing outlet according to claim 2, wherein the body is formed by partially thermal-bonding two sheets of heatproof synthetic resin, two sheets of metal, or a sheet of heatproof synthetic resin or a sheet of metal.

12. The method for manufacturing a pouch pack with a pressing outlet according to claim 2, wherein the body is formed by partially thermal-bonding a sheet of waterproof-coated paper and a sheet made of bio-degradable synthetic resin.

13. A method for manufacturing a pouch pack with a pressing outlet, the method comprising:
    hermetically thermal-bonding sealing portions with a hot-press mold that hot-presses the sealing portions of two sheets overlapping each other to form a body including a space therein; and
    integrally forming at the sealing portions of the body a pressing outlet to allow a substance in the space to be discharged while being opened by pressure,
    wherein the pressing outlet is formed simultaneously with the sealing portions by decrease in temperature only at the portion corresponding to a metal member when the sealing portions are thermally bonded, due to a seating groove formed at a portion of the hot-press mold and the metal member having thermal conductivity lower than the hot-press mold in the seating groove.

14. The method for manufacturing a pouch pack with a pressing outlet according to claim 13, wherein pressure for opening the pressing outlet is adjustable in accordance with the thermal conductivity of the metal member.

15. The method for manufacturing a pouch pack with a pressing outlet according to claim 13, wherein two pressing outlets are formed in parallel apart from each other in the discharging direction of the substance and a preliminary discharging space is formed between the two pressing outlets.

16. The method for manufacturing a pouch pack with a pressing outlet according to claim 14, wherein two pressing outlets are formed in parallel apart from each other in the discharging direction of the substance and a preliminary discharging space is formed between the two pressing outlets.

17. The method for manufacturing a pouch pack with a pressing outlet according to claim 13, wherein the sealing portions are formed along the edge of the body such that one space is formed in the body.

18. The method for manufacturing a pouch pack with a pressing outlet according to claim 14, wherein the sealing portions are formed along the edge of the body such that one space is formed in the body.

19. The method for manufacturing a pouch pack with a pressing outlet according to claim 13, wherein the sealing portions are formed along the edge and an inner separation wall of the body such that a plurality of separate spaces is formed in the body.

20. The method for manufacturing a pouch pack with a pressing outlet according to claim 4, wherein the sealing portions are formed along the edge and an inner separation wall of the body such that a plurality of separate spaces is formed in the body.

21. The method for manufacturing a pouch pack with a pressing outlet according to claim 13, wherein the body is formed by partially thermal-bonding two sheets of heatproof synthetic resin, two sheets of metal, or a sheet of heatproof synthetic resin or a sheet of metal.

22. The method for manufacturing a pouch pack with a pressing outlet according to claim 14, wherein the body is formed by partially thermal-bonding two sheets of heatproof synthetic resin, two sheets of metal, or a sheet of heatproof synthetic resin or a sheet of metal.

23. The method for manufacturing a pouch pack with a pressing outlet according to claim 13, wherein the body is formed by partially thermal-bonding a sheet of waterproof-coated paper and a sheet made of bio-degradable synthetic resin.

24. The method for manufacturing a pouch pack with a pressing outlet according to claim 14, wherein the body is formed by partially thermal-bonding a sheet of waterproof-coated paper and a sheet made of bio-degradable synthetic resin.

* * * * *